(12) United States Patent
Govande et al.

(10) Patent No.: US 8,020,031 B1
(45) Date of Patent: Sep. 13, 2011

(54) SYSTEM AND METHOD FOR CUSTOMIZING A SCSI ERROR RESPONSE RECEIVED FROM A SCSI TARGET IN A STORAGE NETWORK ENVIRONMENT

(75) Inventors: Nilesh Govande, Maharashtra (IN); Rakesh Verma, Maharashtra (IN); Vishal Thakkar, Maharashtra (IN); Dan Meyer, Brentwood, CA (US)

(73) Assignee: LSI Corporation, Milpitas, CA (US)

( * ) Notice: Subject to any disclaimer, the term of this patent is extended or adjusted under 35 U.S.C. 154(b) by 37 days.

(21) Appl. No.: 12/768,754

(22) Filed: Apr. 28, 2010

(51) Int. Cl.
*G06F 11/00* (2006.01)
(52) U.S. Cl. .............................. 714/2; 714/57
(58) Field of Classification Search ................ 714/2, 16, 714/11, 56, 57, 47.1, 48
See application file for complete search history.

(56) References Cited

U.S. PATENT DOCUMENTS 7,664,903 B2 * 2/2010 Belonoznik .................... 710/315
7,945,769 B2 * 5/2011 Hong et al. ........................ 713/1

* cited by examiner

*Primary Examiner* — Dieu-Minh Le
(74) *Attorney, Agent, or Firm* — Prakash Nama; Global IP Services, PLLC

(57) ABSTRACT

A system and method for customizing a SCSI error response received from a SCSI target in a storage network environment is disclosed. In a method for customizing a SCSI error response received from a SCSI target in a storage network environment, a SCSI command is received from a SCSI initiator by a SCSI to ATA bridge. The received SCSI command is translated to provide an ATA command. The ATA command is then sent to an ATA drive. The ATA command is executed by the ATA drive. During execution, if an error occurs, an ATA error response is sent by the ATA drive to the SCSI to ATA bridge. The received ATA error response is translated to a SCSI error response. The SCSI to ATA bridge then obtains a customized SCSI error response using an error look-up table. Further the customized SCSI error response is sent to the SCSI initiator.

38 Claims, 6 Drawing Sheets

SYSTEM AND METHOD FOR CUSTOMIZING A SCSI ERROR RESPONSE RECEIVED FROM A SCSI TARGET IN A STORAGE NETWORK ENVIRONMENT

BACKGROUND

Small computer system interface (SCSI) is a computer protocol that uses a set of standard SCSI commands for transferring data between computers and data storage devices. Typically, a computer initiates SCSI commands which are directed to the data storage devices. The data storage device could be an advanced technology attachment (ATA) disk drive behind a SCSI to ATA bridge. In such a storage network environment, a SCSI initiator sends a SCSI command to the SCSI to ATA bridge. The SCSI to ATA bridge then translates the received SCSI command to an ATA command and then sends the ATA command to ATA targets. The ATA targets then execute the ATA command and perform associated input/output data transfers through the SCSI to ATA bridge. The SCSI to ATA bridge is essentially a variant of a SCSI target in the aforementioned topology.

After receiving a SCSI command by a SCSI target, if an error occurs in servicing the command at the SCSI target, an error response is sent by the associated SCSI target to the SCSI initiator. This error response is a check condition response that is sent back from the SCSI target to the SCSI initiator. Further, in response to the check condition, the SCSI initiator sends a SCSI request sense command which is used to obtain error information from the SCSI target. The SCSI target then responds to the SCSI request sense command with a set of SCSI sense data which, typically, includes 3 fields, namely a sense key, an additional sense code (ASC) and an additional sense code qualifier (ASQC), which gives increasing levels of detail about the error to the SCSI initiator. The SCSI initiator then takes action based on the received set of SCSI sense data.

However, in a storage network environment, typically, several generations of SCSI initiators and SCSI targets are used. Such an error response interpreted by one generation of a SCSI initiator may not be correctly interpreted by another generation of the SCSI initiator. In such a scenario, if the SCSI initiator cannot interpret the error response sent by the SCSI target, then a required action may not be performed by the SCSI initiator and this can result in severe and/or unnecessary error recovery actions, which can significantly degrade storage network performance.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A system and method of customizing a SCSI error response received from a SCSI target in a storage network environment is disclosed. In one aspect, in a method for customizing a SCSI error response received from a SCSI target in a storage network environment, a SCSI command is received from a SCSI initiator by a SCSI to ATA bridge. The received SCSI command is translated by the SCSI to ATA bridge to provide an ATA command. The ATA command is then sent to an ATA drive by the SCSI to ATA bridge. The ATA command is executed by the ATA drive.

Further, it is determined whether the ATA command was executed successfully by the ATA drive. If it is determined not, an ATA error response is sent by the ATA drive to the SCSI to ATA bridge. The received ATA error response is translated to a SCSI error response by the SCSI to ATA bridge. A customized SCSI error response is obtained using an error look-up table by the SCSI to ATA bridge. Further, the customized SCSI error response is sent to the SCSI initiator by the SCSI to ATA bridge.

In another aspect, a non-transitory computer-readable storage medium for customizing a SCSI error response received from a SCSI target in a storage network environment has instructions that, when executed by a computing device, cause the computing device to perform a method as described above.

In yet another aspect, a system for customizing a SCSI error response received from a SCSI target in a storage network environment includes one or more SCSI initiators, an ATA drive and a SCSI to ATA bridge coupled between the one or more SCSI initiators and the ATA drive. The SCSI to ATA bridge includes memory operatively coupled to the SCSI to ATA bridge. The memory includes a command processing module and an error lookup table. The command processing module includes a command translation module and an instance ID generator, and has instructions capable of performing the method as described above.

In a further another aspect, a system for customizing a SCSI error response received from a SCSI target in a storage network environment includes one or more SCSI initiators, one or more ATA drives and a host bus adapter (HBA) controller coupled between the one or more SCSI initiators and the one or more ATA drives. The HBA controller includes memory operatively coupled to the HBA controller. The memory includes a SCSI to ATA translation (SAT) module, where the SAT module includes a command processing module and an error lookup table. The command processing module includes a command translation module and an instance ID generator, and has instructions capable of performing the method as described above.

In yet a further another aspect, a system for customizing a SCSI error response received from a SCSI target in a storage network environment includes one or more SCSI initiators and a SCSI drive coupled to the one or more SCSI initiators. The SCSI drive includes memory operatively coupled to the SCSI drive. The memory includes a command processing module and an error lookup table. The command processing module includes a command translation module and an instance ID generator, and has instructions capable of performing the method as described above.

In another aspect, a system for customizing a SCSI error response received from a SCSI target in a storage network environment includes one or more SCSI initiators and a SCSI enclosure coupled to the one or more SCSI initiators. The SCSI enclosure includes memory operatively coupled to the SCSI enclosure. The memory includes a command processing module and an error lookup table. The command processing module includes a command translation module and an instance ID generator, and has instructions capable of performing the method as described above.

Other features of the embodiments will be apparent from the accompanying drawings and from the detailed description that follows.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method or customizing a SCSI error response received from a SCSI target in a storage network environment is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Figure 1:
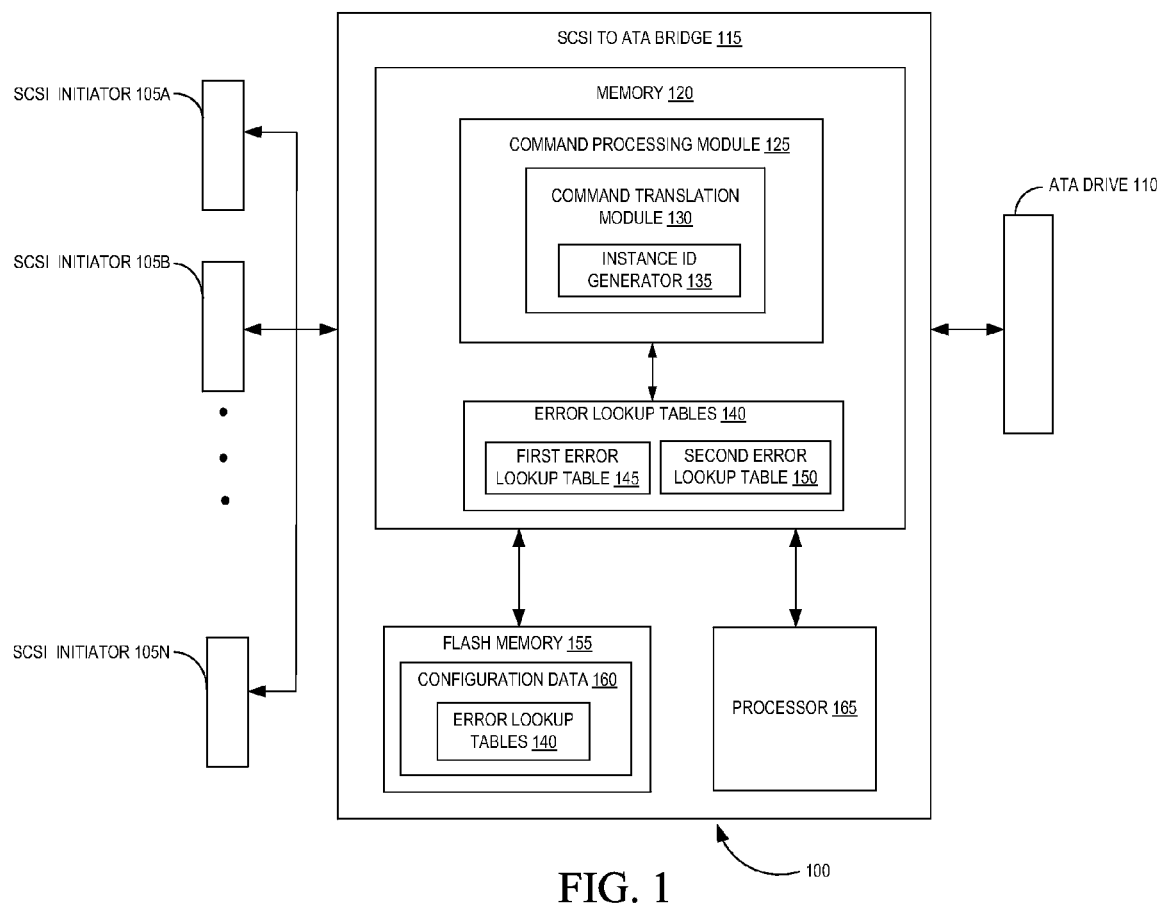
FIG. 1 illustrates a block diagram of a storage network environment, according to one embodiment.

FIG. 1 illustrates a block diagram of a storage network environment 100, according to one embodiment. Particularly, FIG. 1 illustrates a system for customizing a SCSI error response in the storage network environment 100. The system includes SCSI initiators 105A-N, an ATA drive 110 and a SCSI to ATA bridge 115. The SCSI to ATA bridge 115 is coupled between the SCSI initiators 105A-N and the ATA drive 110 and includes memory 120, flash memory 155 and a processor 165. The memory 120 is operatively coupled to the SCSI to ATA bridge 115 and includes a command processing module 125 and error lookup tables 140. The command processing module 125 includes a command translation module 130 and an instance ID generator 135. The error lookup tables 140 includes a first error lookup table 145 and a second error lookup table 150, as illustrated in FIG. 1.

In operation, the command processing module 125 of the SCSI to ATA bridge 115 receives a SCSI command from a SCSI initiator 105A for sending to the ATA drive 110 for execution. The received SCSI command is translated to an ATA command by the command translation module 130 in the SCSI to ATA bridge 115. The ATA command is then sent to the ATA drive 110 for execution. During the execution of the ATA command, if an error occurs, an ATA error response is sent to the command processing module 125. The command processing module 125 translates the received ATA error response to a SCSI error response.

According to an embodiment of the present invention, the command processing module 125 obtains a customized SCSI error response by looking up the SCSI error response in the error lookup tables 140. In one exemplary implementation, an instance identifier (ID) associated with the SCSI error response is determined by the instance ID generator 135. An error index associated with the instance ID is then determined using the first error lookup table 145. Further, the customized SCSI error response associated with the error index is extracted using the second error lookup table 150. If no associated error index is found in the first error lookup table 145, a default error index is used to extract the customized SCSI error response from the second error lookup table 150.

It can be noted that the error lookup tables 140 are loaded into the memory 120 from the flash memory 155 while loading configuration data 160 during boot-up of the storage network environment 100. Once, the customized SCSI error response is obtained, the command processing module 125 sends the customized SCSI error response to the SCSI initiator 105A. Further, the SCSI initiator 105A performs an error recovery operation based on the received customized SCSI error response.

If no error occurs during the execution of the ATA command by the ATA drive 110, a notification associated with the successful execution of the ATA command is sent to the command processing module 125. The command translation module 130 translates the notification associated with the successful execution of the ATA command and an associated successful execution response is sent to the SCSI initiator 105A.

According to another embodiment of the present invention, when the SCSI command is received by the command processing module 125, it is determined whether the SCSI command has any errors. If it is determined so, a customized SCSI error response is obtained using the error lookup tables 140 and is sent to the SCSI initiator 105A. If it is determined not, the received SCSI command is translated to provide the ATA command by the command translation module 130.

According to yet another embodiment of the present invention, when the SCSI command is received by the command processing module 125, it is determined whether the SCSI command can be translated to the ATA command. If it is determined so, the received SCSI command is translated to provide the ATA command and is sent to the ATA drive 110. If it is determined not, the received SCSI command is executed and if the execution fails, a customized SCSI error response is obtained using the error lookup tables 140. The customized SCSI error response is then sent to the SCSI initiator 105A.

Figure 2:
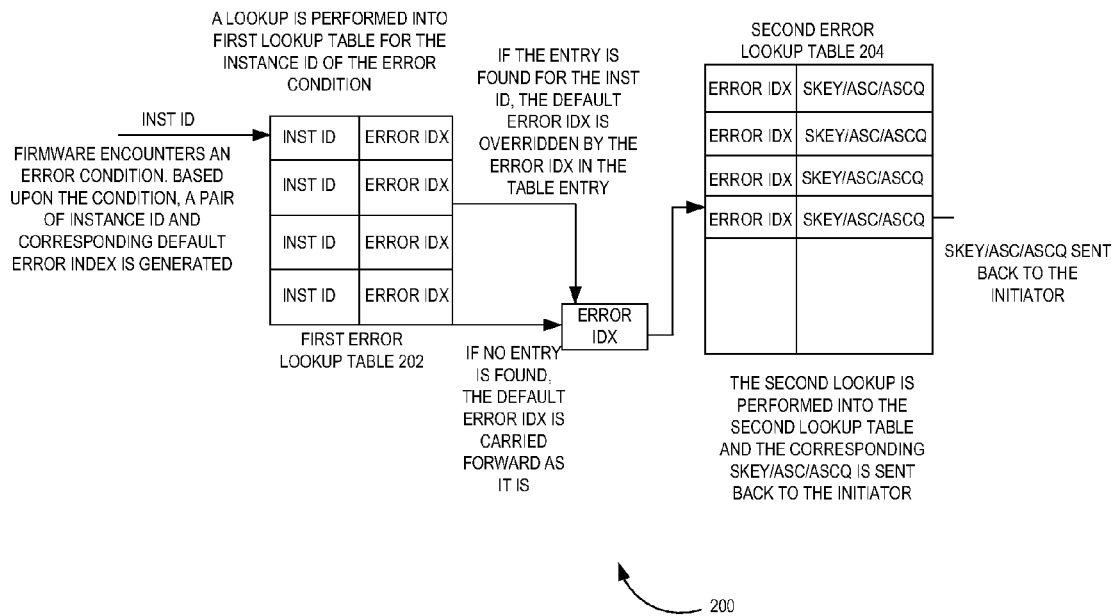
FIG. 2 illustrates error lookup tables, according to one embodiment.

FIG. 2 illustrates error lookup tables, according to one embodiment. Particularly, FIG. 2 illustrates obtaining a customized SCSI error response using a first error lookup table 202 and a second error lookup table 204. In one exemplary implementation, when a SCSI error response is received from a SCSI target in the storage network environment, an instance ID associated with the SCSI error response is determined. The determined instance ID is used to lookup the first error lookup table 202 to determine an associated error index.

As shown in FIG. 2, the first error lookup table 202 includes tables showing instance IDs and modified error index associated with each instance ID. The instance ID represents an instance where a SCSI error response is sent to a SCSI initiator. A first entry of the first error lookup table 202 which is usually called as a special entry includes a number of entries present in the first error lookup table 202. By default, the special entry is the only entry in the first error lookup table 202. As entries are added to the first error lookup table 202, the special entry gets modified to indicate a total number of entries in the first error lookup table 202.

The associated error index is then looked up in the second error lookup table 204 to extract the customized SCSI error response. If no associated error index is found in the first error lookup table 202, then a default error index is used to extract the customized SCSI error response from the second error lookup table 204.

As shown in FIG. 2, the second error lookup table 204 includes sense information (e.g., sense key, additional sense code (ASC) and additional sense code qualifier (ASQC)). The indices in the second error lookup table 204 are referred to as error index—'errorldx'. The 'errorldx' specifies a class of errors and each 'errorldx' is associated with a unique combination of sense key, ASC and ASCQ.

Using configuration data update method, the sense key, ASC and ASCQ for a given class of errors (errorldx) in the second error lookup table 204 could be overridden. The second error lookup table 204 is looked up for either default or overridden errorldx for a given instance ID and corresponding sense Key, ASC and ASCQ is sent out to the SCSI initiator along with the check condition response. Based on the customized SCSI error response received by the SCSI initiator, an error recovery operation is performed.

Using the configuration data update method, the entries are added to the first error lookup table 202 such that an instance ID is associated with a non default errorldx. Thus, corresponding sense key, ASC, ASCQ (which are non-default) are sent out as a SCSI error response for a corresponding instance of the error.

Figure 3:
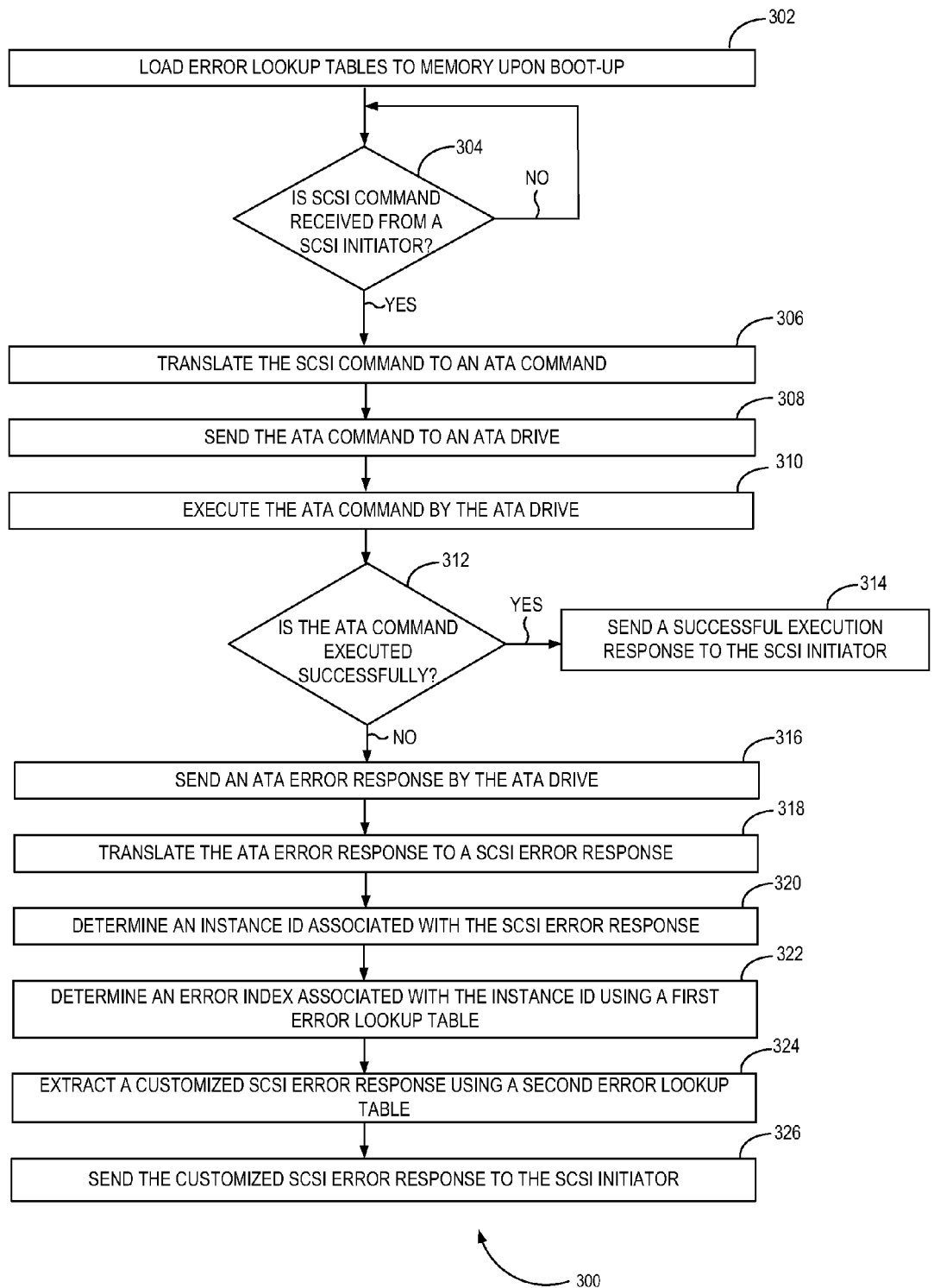
FIG. 3 is a flow chart of a method for customizing a SCSI error response received from a SCSI target in a storage network environment, according to one embodiment.

FIG. 3 is a flow chart of a method 300 for customizing a SCSI error response received from a SCSI target in a storage network environment, according to one embodiment. The SCSI target may include a SCSI to ATA bridge, a SCSI drive, a SCSI host bus adapter (HBA) with SAT module, a SCSI enclosure and the like. At step 302, error lookup tables are loaded to memory of the SCSI target from a flash memory upon boot-up of the storage network environment. At step 304, it is checked whether a SCSI command is received from a SCSI initiator in the storage network environment. If it is determined that the SCSI command is received, the method 300 continues at step 306, else the method 300 is routed to perform step 304. At step 306, the received SCSI command is translated to an ATA command.

At step 308, the ATA command is sent to an ATA drive. At step 310, the ATA command is executed by the ATA drive. At step 312, it is determined whether the ATA command is executed successfully by the ATA drive. If it is determined that the ATA command is executed successfully, then step 314 is performed, else step 316 is performed. At step 314, a successful execution response is sent to the SCSI initiator. For example, the ATA drive sends a notification associated with the successful execution of the ATA command to the SCSI target. The notification associated with the successful execution is then translated to the successful execution response for sending to the SCSI initiator.

At step 316, an ATA error response is sent by the ATA drive to the SCSI target. AT step 318, the ATA error response is translated to a SCSI error response by the SCSI target. At step 320, an instance ID associated with the SCSI error response is determined. At step 322, an error index associated with the instance ID is determined using a first error lookup table. At step 324, a customized SCSI error response associated with the determined error index is extracted using a second error lookup table.

If no associated error index is found in the first error lookup table at step 322, then a default error index is used to extract the customized SCSI error response from the second error lookup table. At step 326, the customized SCSI error response is sent to the SCSI initiator. Based on the received customized SCSI error response, the SCSI initiator performs an error recovery operation.

In one embodiment, during translation of the received SCSI command to the ATA command at step 306, it is determined whether the received SCSI command has any errors by the SCSI target. If it is determined so, the first error lookup table and the second error lookup table are used to obtain a customized SCSI error response by the SCSI target. Further, the customized SCSI error response is sent to the SCSI initiator. If it is determined not, the received SCSI command is translated to provide the ATA command by the SCSI target.

In another embodiment, during translation of the received SCSI command to the ATA command at step 306, it is determined whether the received SCSI command can be translated to the ATA command by the SCSI target. If it is determined so, the received SCSI command is translated by the SCSI target to provide the ATA command. The ATA command is then sent to the ATA drive by the SCSI target. If it is determined that the received SCSI command cannot be translated to the ATA command, then the received SCSI command is executed. If the execution fails, a customized SCSI error response is obtained by the SCSI target using the first error lookup table and the second error lookup table. The customized SCSI error response is then sent to the SCSI initiator by the SCSI target.

Figure 4:
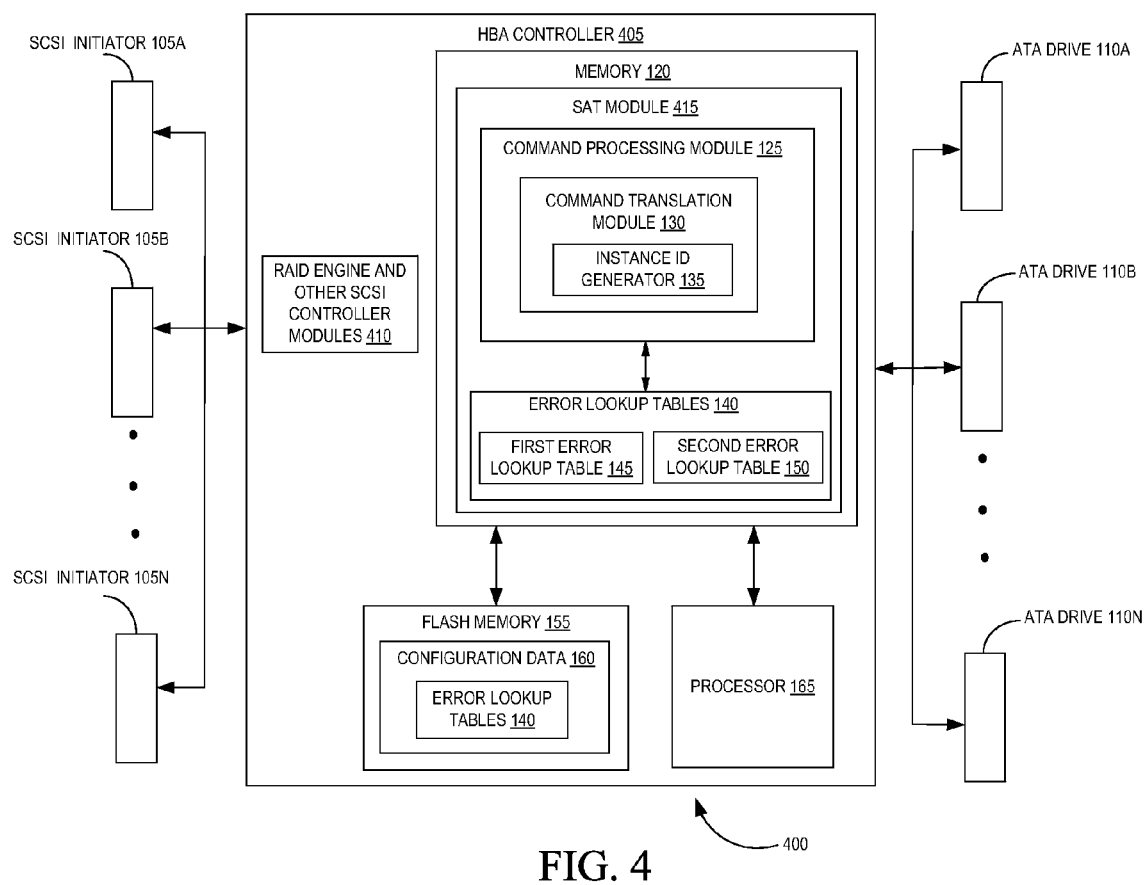
FIG. 4 illustrates a block diagram of a storage network environment, according to another embodiment.

FIG. 4 illustrates a block diagram of a storage network environment 400, according to another embodiment. Particularly, FIG. 4 illustrates a system for customizing a SCSI error response in the storage network environment 400. The system includes the SCSI initiators 105A-N, ATA drives 110A-N and an HBA controller 405. The HBA controller 405 is coupled between the SCSI initiators 105A-N and the ATA drives 110A-N and includes the memory 120, the flash memory 155 and the processor 165. It should be noted that the HBA controller 405 facilitates more than one ATA drives to be coupled to the HBA controller 405. The HBA controller 405 also includes a RAID engine and other SCSI modules 410, as illustrated in FIG. 4.

The memory 120 is operatively coupled to the SCSI to ATA bridge 115 and includes a SAT module 415. The SAT module 415 enables translation of the SCSI command to the ATA command and includes the command processing module 125 and the error lookup tables 140. The command processing module 125 includes the command translation module 130 and the instance ID generator 135. The error lookup tables 140 includes the first error lookup table 145 and the second error lookup table 150, as illustrated in FIG. 4.

The method of operation of the system illustrated in FIG. 4 is similar to the operation of the system described in FIG. 1.

Figure 5:
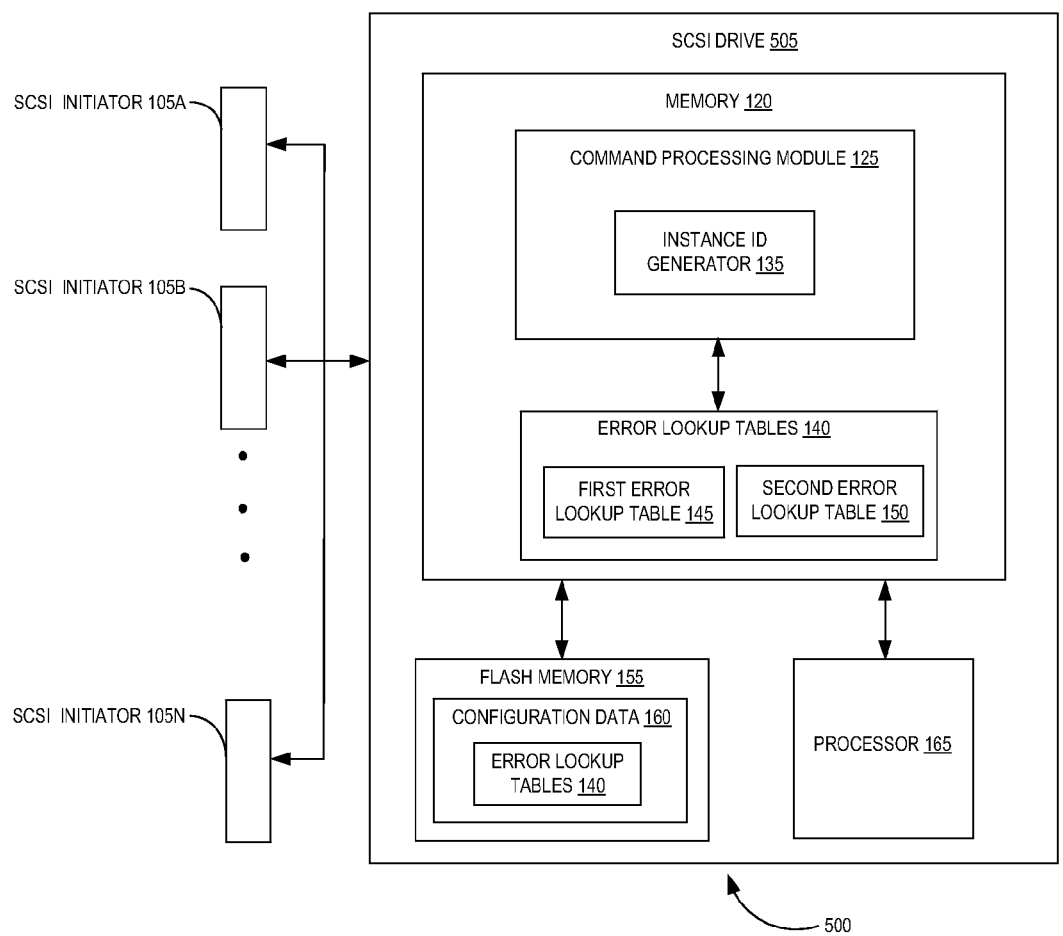
FIG. 5 illustrates a block diagram of a storage network environment, according to another embodiment.

FIG. 5 illustrates a block diagram of a storage network environment 500, according to another embodiment. Particularly, FIG. 5 illustrates a system for customizing a SCSI error response in the storage network environment 500. As illustrated, the system includes the SCSI initiators 105A-N coupled to a SCSI drive 505. The SCSI drive 505 includes the memory 120, the flash memory 155 and the processor 165. The memory 120 is operatively coupled to the SCSI drive 505 and includes the command processing module 125 and the error lookup tables 140. The command processing module 125 includes the instance ID generator 135. The error lookup tables 140 includes the first error lookup table 145 and the second error lookup table 150, as illustrated in FIG. 5.

In operation, the command processing module 125 receives a SCSI command from a SCSI initiator 105A for execution by the SCSI drive 505. During execution of the SCSI command, if an error occurs, a SCSI error response is generated by the SCSI drive 505.

According to an embodiment of the present invention, the command processing module 125 obtains a customized SCSI error response by looking up the SCSI error response in the error lookup tables 140. In one exemplary implementation, an instance ID associated with the SCSI error response is determined by the instance ID generator 135. An error index associated with the instance ID is then determined using the first error lookup table 145. Further, the customized SCSI error response associated with the error index is extracted using the second error lookup table 150. If no associated error index is found in the first error lookup table 145, a default error index is used to extract the customized SCSI error response from the second error lookup table 150.

It can be noted that the error lookup tables 140 are loaded into the memory 120 from the flash memory 155 while loading the configuration data 160 during boot-up of the storage network environment 500. Once, the customized SCSI error response is obtained, the command processing module 125 sends the customized SCSI error response to the SCSI initiator 105A. Further, the SCSI initiator 105A performs an error recovery operation based on the received customized SCSI error response. If no error occurs during the execution of the SCSI command by the SCSI drive 505, a successful execution response is sent to the SCSI initiator 105A.

Figure 6:
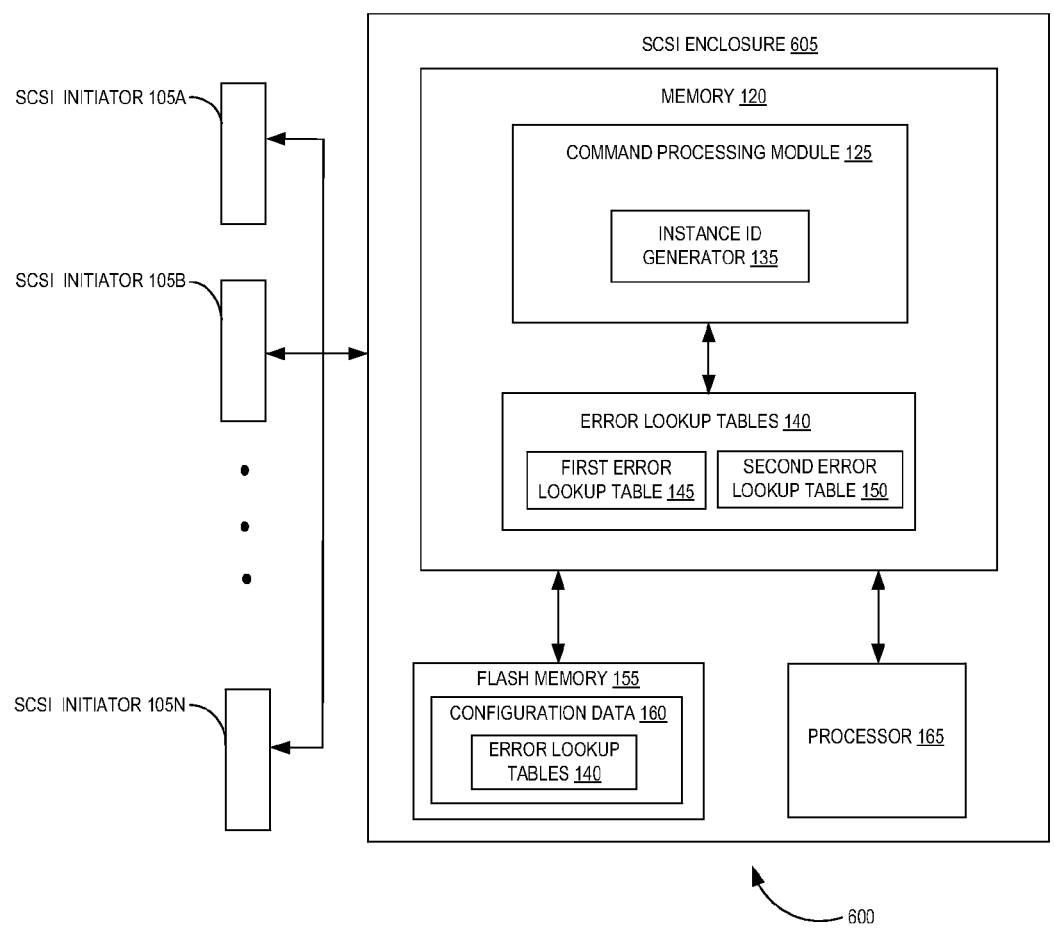
FIG. 6 illustrates a block diagram of a storage network environment, according to another embodiment.

FIG. 6 illustrates a block diagram of a storage network environment 600, according to another embodiment. Particularly, FIG. 6 illustrates a system for customizing a SCSI error response in the storage network environment 600. As illustrated, the system includes the SCSI initiators 105A-N coupled to a SCSI enclosure 605. The SCSI enclosure 605 includes the memory 120, the flash memory 155 and the processor 165. The memory 120 is operatively coupled to the SCSI enclosure 605 and includes the command processing module 125 and the error lookup tables 140. The command processing module 125 includes the instance ID generator 135. The error lookup tables 140 includes the first error lookup table 145 and the second error lookup table 150, as illustrated in FIG. 6.

The method of operation of the system illustrated in FIG. 6 is similar to the operation of the system described in FIG. 5. Moreover, in one embodiment, a non-transitory computer-readable storage medium having instructions that, when executed by a computing device, may cause the computing device to perform one or more methods described in FIGS. 1 through 6.

In various embodiments, the methods and systems described in FIGS. 1 through 6 customize error responses generated by the ATA drives as well as the SCSI targets using the error lookup tables such that the SCSI initiators can interpret any kind of errors and perform required actions in the storage network environment. Any generation of the SCSI initiators and the SCSI targets may be used together in the storage network environment. The above-described methods and systems provide an excellent testing framework for the SCSI initiators where the SCSI target can respond to any kind of the errors.

Although the present embodiments have been described with reference to specific example embodiments, it will be evident that various modifications and changes may be made to these embodiments without departing from the broader spirit and scope of the various embodiments. Furthermore, the various devices, modules and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for customizing a SCSI error response received from a SCSI target in a storage network environment, comprising:

receiving a SCSI command from a SCSI initiator by a SCSI to ATA bridge;

translating the received SCSI command by the SCSI to ATA bridge to provide an ATA command;

sending the ATA command to an ATA drive by the SCSI to ATA bridge;

executing the ATA command by the ATA drive;

determining whether the ATA command was executed successfully by the ATA drive;

if not, sending an ATA error response by the ATA drive to the SCSI to ATA bridge;

translating the received ATA error response to a SCSI error response by the SCSI to ATA bridge;

obtaining a customized SCSI error response using an error look-up table by the SCSI to ATA bridge; and sending the customized SCSI error response to the SCSI initiator by the SCSI to ATA bridge.

2. The method of claim 1, further comprising:

if so, sending a notification associated with the successful execution of the ATA command to the SCSI to ATA bridge by the ATA drive;

translating the notification associated with the successful execution of the ATA command by the SCSI to ATA bridge; and sending an associated successful execution response to the SCSI initiator.

3. The method of claim 1, wherein obtaining the customized SCSI error response using the error look-up table by the SCSI to ATA bridge comprises:

determining an instance ID associated with the SCSI error response;

determining an error index associated with the determined instance ID using a first error lookup table; and extracting the customized SCSI error response associated with the determined error index using a second error lookup table.

4. The method of claim 3, further comprising:

if no associated error index is found in the first error lookup table, then using a default error index to extract the customized SCSI error response from the second error lookup table.

5. The method of claim 1, wherein translating the received SCSI command by the SCSI to ATA bridge to provide the ATA command comprises:

determining whether the received SCSI command has any errors by the SCSI to ATA bridge;

if so, using the error lookup table to obtain a customized SCSI error response by the SCSI to ATA bridge and sending the customized SCSI error response to the SCSI initiator by the SCSI to ATA bridge; and If not, translating the received SCSI command by the SCSI to ATA bridge to provide the ATA command.

6. The method of claim 5, further comprising:

performing an error recovery operation based on the received customized SCSI error response by the SCSI initiator.

7. The method of claim 5, wherein translating the received SCSI command by the SCSI to ATA bridge to provide the ATA command comprises:

determining whether the received SCSI command can be translated to the ATA command by the SCSI to ATA bridge;

if so, translating the received SCSI command by the SCSI to ATA bridge to provide the ATA command and sending the ATA command to the ATA drive by the SCSI to ATA bridge; and if not, then, executing the received SCSI command on the SCSI to ATA bridge and if the execution fails, obtaining a customized SCSI error response by the SCSI to ATA bridge using the error lookup table and sending the customized SCSI error response to the SCSI initiator by the SCSI to ATA bridge.

8. A non-transitory computer-readable storage medium for customizing a SCSI error response received from a SCSI target in a storage network environment having instructions that, when executed by a computing device, cause the computing device to perform a method comprising:
   receiving a SCSI command from a SCSI initiator by a SCSI to ATA bridge;
   translating the received SCSI command by the SCSI to ATA bridge to provide an ATA command;
   sending the ATA command to an ATA drive by the SCSI to ATA bridge;
   executing the ATA command by the ATA drive;
   determining whether the ATA command was executed successfully by the ATA drive;
   if not, sending an ATA error response by the ATA drive to the SCSI to ATA bridge;
   translating the received ATA error response to a SCSI error response by the SCSI to SCSI to ATA bridge;
   obtaining a customized SCSI error response using an error look-up table by the SCSI to ATA bridge; and
   sending the customized SCSI error response to the SCSI initiator by the SCSI to ATA bridge.

9. The non-transitory computer-readable storage medium of claim 8, further comprising:
   if so, sending a notification associated with the successful execution of the ATA command to the SCSI to ATA bridge by the ATA drive;
   translating the notification associated with the successful execution of the ATA command by the SCSI to ATA bridge; and
   sending an associated successful execution response to the SCSI initiator.

10. The non-transitory computer-readable storage medium of claim 8, wherein obtaining the customized SCSI error response using a look-up table by the SCSI to ATA bridge comprises:
   determining an instance ID associated with the SCSI error response;
   determining an error index associated with the determined instance ID using a first error lookup table; and
   extracting the customized SCSI error response associated with the determined error index using a second error lookup table.

11. The non-transitory computer-readable storage medium of claim 10, further comprising:
   if no associated error index is found in the first error lookup table, then using a default error index to extract the customized SCSI error response from the second error lookup table.

12. The non-transitory computer-readable storage medium of claim 8, wherein translating the received SCSI command by the SCSI to ATA bridge to provide the ATA command comprises:
   determining whether the received SCSI command has any errors by the SCSI to ATA bridge;
   if so, using an error lookup table to obtain a customized SCSI error response by the SCSI to ATA bridge and sending the customized SCSI error response to the SCSI initiator by the SCSI to ATA bridge; and
   If not, translating the received SCSI command by the SCSI to ATA bridge to provide the ATA command.

13. The non-transitory computer-readable storage medium of claim 12, further comprising:
   performing an error recovery operation based on the received customized SCSI error response by the SCSI initiator.

14. The non-transitory computer-readable storage medium of claim 12, wherein translating the received SCSI command by the SCSI to ATA bridge to provide the ATA command comprises:
   determining whether the received SCSI command can be translated to the ATA command by the SCSI to ATA bridge;
   if so, translating the received SCSI command by the SCSI to ATA bridge to provide the ATA command and sending the ATA command to the ATA drive by the SCSI to ATA bridge; and
   if not, then, executing the received SCSI command on the SCSI to ATA bridge and if the execution fails, obtaining a customized SCSI error response by the SCSI to ATA bridge using the error lookup table and sending the customized SCSI error response to the SCSI initiator by the SCSI to ATA bridge.

15. A system for customizing a SCSI error response received from a SCSI target in a storage network environment, comprising:
   one or more SCSI initiators;
   an ATA drive;
   a SCSI to ATA bridge coupled between the one or more SCSI initiators and the ATA drive, wherein the SCSI to ATA bridge comprises:
      memory operatively coupled to the SCSI to ATA bridge, wherein the memory includes a command processing module and an error lookup table, and wherein the command processing module includes a command translation module and an instance ID generator, having instructions capable of:
         receiving a SCSI command from one of the one or more SCSI initiators by the command processing module;
         translating the received SCSI command by the command translating module to provide an ATA command;
         sending the ATA command to the ATA drive by the command processing module;
         executing the ATA command by the ATA drive;
         determining whether the ATA command was executed successfully by the ATA drive;
         if not, sending an ATA error response by the ATA drive to the command processing module;
         translating the received ATA error response to a SCSI error response by the command processing module;
         obtaining a customized SCSI error response using the error look-up table by the command translating module; and
         sending the customized SCSI error response to the SCSI initiator by the command processing module.

16. The system of claim 15, further comprising the command processing module having instructions capable of:
   if so, sending a notification associated with the successful execution of the ATA command to the command processing module;
   translating the notification associated with the successful execution of the ATA command by the command processing module; and
   sending an associated successful execution response to the SCSI initiator.

17. The system of claim 15, wherein the command processing module has instructions capable of obtaining the customized SCSI error response using the error look-up table comprising:
 determining an instance ID associated with the SCSI error response using the instance ID generator;
 determining an error index associated with the determined instance ID using a first error lookup table; and
 extracting the customized SCSI error response associated with the determined error index using a second error lookup table.

18. The method of claim 17, further comprising the command processing module having instructions capable of:
 using a default error index to extract the customized SCSI error response from the second error lookup table if no associated error index is found in the first error lookup table.

19. The system of claim 15, wherein the command processing module has instructions capable of translating the received SCSI command to provide the ATA command comprising:
 determining whether the received SCSI command has any errors;
 if so, using an error lookup table to obtain a customized SCSI error response and sending the error response to the SCSI initiator; and
 if not, translating the received SCSI command to provide the ATA command.

20. The system of claim 19, further comprising the command processing module having instructions capable of:
 performing an error recovery operation based on the received customized SCSI error response by the SCSI initiator.

21. The system of claim 15, wherein the command processing module has instructions capable of translating the received SCSI command to provide the ATA command comprising:
 determining whether the received SCSI command can be translated to the ATA command;
 if so, translating the received SCSI command to provide the ATA command and sending the ATA command to the ATA drive; and
 if not, then, executing the received SCSI command and if the execution fails, obtaining a customized SCSI error response using the error lookup table and sending the customized SCSI error response to the SCSI initiator.

22. A system for customizing a SCSI error response received from a SCSI target in a storage network environment, comprising:
 one or more SCSI initiators;
 one or more ATA drives;
 a host bus adapter (HBA) controller coupled between the one or more SCSI initiators and the one or more ATA drives, wherein the HBA controller comprises:
  memory operatively coupled to the HBA controller, wherein the memory includes a SCSI to ATA translation (SAT) module, wherein the SAT module includes a command processing module and an error lookup table, and wherein the command processing module includes a command translation module and an instance ID generator, having instructions capable of:
   receiving a SCSI command from one of the one or more SCSI initiators by the command processing module;
   translating the received SCSI command by the command translating module to provide an ATA command;
   sending the ATA command to one of the one or more ATA drives by the command processing module;
   executing the ATA command by the one of the one or more ATA drives;
   determining whether the ATA command was executed successfully by the one of the one or more ATA drives;
   if not, sending an ATA error response by the one of the one or more ATA drives to the command processing module;
   translating the received ATA error response to a SCSI error response by the command processing module;
   obtaining a customized SCSI error response using the error look-up table by the command translating module; and
   sending the customized SCSI error response to the one of the one or more SCSI initiators by the command processing module.

23. The system of claim 22, further comprising the command processing module having instructions capable of:
 if so, sending a notification associated with the successful execution of the ATA command;
 translating the notification associated with the successful execution of the ATA command; and
 sending an associated successful execution response to the SCSI initiator.

24. The system of claim 22, wherein the command processing module has instructions capable of obtaining the customized SCSI error response using the error look-up table comprising:
 determining an instance ID associated with the SCSI error response using the instance ID generator;
 determining an error index associated with the determined instance ID using a first error lookup table; and
 extracting the customized SCSI error response associated with the determined error index using a second error lookup table.

25. The system of claim 24, further comprising the command processing module having instructions capable of:
 using a default error index to extract the customized SCSI error response from the second error lookup table if no associated error index is found in the first error lookup table.

26. The system of claim 22, wherein the command processing module has instructions capable of translating the received SCSI command to provide the ATA command comprising:
 determining whether the received SCSI command has any errors;
 if so, using an error lookup table to obtain a customized SCSI error response and sending the error response to the SCSI initiator; and
 If not, translating the received SCSI command by the SCSI to ATA bridge to provide the ATA command.

27. The system of claim 26, further comprising the command processing module having instructions capable of:
 performing an error recovery operation based on the received customized SCSI error response by the SCSI initiator.

28. The system of claim 22, wherein the command processing module has instructions capable of translating the received SCSI command to provide the ATA command comprising:
 determining whether the received SCSI command can be translated to the ATA command;

if so, translating the received SCSI command to provide the ATA command and sending the ATA command to the one of the one or more ATA drives; and if not, then, executing the received SCSI command and if the execution fails, obtaining a customized SCSI error response using the error lookup table and sending the customized SCSI error response to the SCSI initiator.

29. A system for customizing a SCSI error response received from a SCSI target in a storage network environment, comprising:

one or more SCSI initiators;

a SCSI drive coupled to the one or more SCSI initiators, wherein the SCSI drive includes memory, wherein the memory is operatively coupled to the SCSI drive, wherein the memory includes a command processing module and an error lookup table, and wherein the command processing module includes a command translation module and an instance ID generator, having instructions capable of:

receiving a SCSI command from one of the one or more SCSI initiators by the command processing module;

executing the SCSI command by the SCSI drive;

determining whether the SCSI command was executed successfully by the SCSI drive;

if not, generating a SCSI error response by the SCSI drive;

obtaining a customized SCSI error response using the error look-up table by the command processing module; and sending the customized SCSI error response to the one of the one or more SCSI initiators by the command processing module.

30. The system of claim 29, further comprising the command processing module having instructions capable of:

if so, sending a successful execution response to the one of the one or more SCSI initiators.

31. The system of claim 29, wherein the command processing module has instructions capable of obtaining the customized SCSI error response comprising:

determining an instance ID associated with the SCSI error response using the instance ID generator;

determining an error index associated with the determined instance ID using a first error lookup table; and extracting the customized SCSI error response associated with the determined error index using a second error lookup table.

32. The method of claim 31, further comprising the command processing module having instructions capable of:

using a default error index to extract the customized SCSI error response from the second error lookup table if no associated error index is found in the first error lookup table.

33. The system of claim 32, further comprising the command processing module having instructions capable of:

performing an error recovery operation based on the received customized SCSI error response by the one of the one or more SCSI initiators.

34. A system for customizing a SCSI error response received from a SCSI target in a storage network environment, comprising:

one or more SCSI initiators;

a SCSI enclosure coupled to the one or more SCSI initiators, wherein the SCSI enclosure includes memory, wherein the memory is operatively coupled to the SCSI enclosure, wherein the memory includes a command processing module and an error lookup table, wherein the command processing module includes a command translation module and an instance ID generator, having instructions capable of:

receiving a SCSI command from one of the one or more SCSI initiators by the command processing module;

executing the SCSI command by the SCSI enclosure;

determining whether the SCSI command was executed successfully by the SCSI enclosure;

if not, generating a SCSI error response by the SCSI enclosure;

obtaining a customized SCSI error response using the error look-up table by the command processing module; and sending the customized SCSI error response to the one of the one or more SCSI initiators by the command processing module.

35. The system of claim 34, further comprising the command processing module having instructions capable of:

if so, sending a successful execution response to the one of the one or more SCSI initiators.

36. The system of claim 34, wherein the command processing module has instructions capable of obtaining the customized SCSI error response using an error look-up table comprising:

determining an instance ID associated with the SCSI error response using the instance ID generator determining an error index associated with the determined instance ID using a first error lookup table; and extracting the customized SCSI error response associated with the determined error index using a second error lookup table.

37. The method of claim 36, further comprising the command processing module having instructions capable of:

using a default error index to extract the customized error information from the second error lookup table if no associated error index is found in the first lookup table.

38. The system of claim 37, further comprising the command processing module having instructions capable of:

performing an error recovery operation based on the received customized SCSI error response by the SCSI initiator.

* * * * *